United States Patent
Zylla et al.

(10) Patent No.: US 12,507,681 B1
(45) Date of Patent: Dec. 30, 2025

(54) LURE DEVICE

(71) Applicants: Daniel John Zylla, Buffalo, MN (US);
Heather Rafnson Zylla, Buffalo, MN (US)

(72) Inventors: Daniel John Zylla, Buffalo, MN (US);
Heather Rafnson Zylla, Buffalo, MN (US)

( * ) Notice: Subject to any disclaimer, the term of this patent is extended or adjusted under 35 U.S.C. 154(b) by 0 days.

(21) Appl. No.: 19/074,640

(22) Filed: Mar. 10, 2025

(51) Int. Cl.
*A01K 85/00* (2006.01)

(52) U.S. Cl.
CPC ...... *A01K 85/1827* (2022.02); *A01K 85/1837* (2022.02); *A01K 85/1851* (2022.02); *A01K 85/1853* (2022.02)

(58) Field of Classification Search
CPC ............ A01K 85/1837; A01K 85/1841; A01K 91/06; A01K 99/00
See application file for complete search history.

(56) References Cited

U.S. PATENT DOCUMENTS

| | | | | |
|---|---|---|---|---|
| 1,419,540 A * | 6/1922 | Brown | ................. | A01K 85/02 43/42.42 |
| 2,294,081 A * | 8/1942 | Bradford | ................. | A01K 85/10 43/42.22 |
| 2,459,819 A | 1/1949 | Hoage | | |
| 2,576,795 A * | 11/1951 | Lane | ................. | A01K 83/00 43/42.42 |
| 2,598,011 A | 5/1952 | Pitre | | |
| 2,758,411 A | 8/1956 | Theriault | | |
| 2,787,077 A | 4/1957 | Keiter | | |
| 2,788,606 A * | 4/1957 | Boggs | ................. | A01K 97/24 43/17.2 |
| 3,040,468 A * | 6/1962 | Knapton | ................. | A01K 85/00 43/42.49 |
| 3,131,504 A | 5/1964 | Hauik | | |
| 3,587,189 A | 6/1971 | Kopicko | | |
| 3,783,549 A * | 1/1974 | Griggs | ................. | A01K 91/06 43/42.4 |
| 4,161,838 A * | 7/1979 | Gapen | ................. | A01K 91/06 43/42.11 |
| 4,314,420 A * | 2/1982 | Dickinson | ............. | A01K 95/00 43/42.39 |
| 7,185,457 B2 | 3/2007 | Nichols | | |
| 8,347,547 B1 | 1/2013 | Houdek | | |
| 2003/0159327 A1* | 8/2003 | Roemer | ............... | A01K 85/00 43/42.13 |
| 2008/0000139 A1* | 1/2008 | Selvaggio | ............. | A01K 91/06 43/42.06 |
| 2008/0250696 A1* | 10/2008 | Brasseur | ............... | A01K 91/08 43/43.1 |
| 2022/0264856 A1* | 8/2022 | Malooley | ............. | A01K 83/06 |

* cited by examiner

*Primary Examiner* — Christopher P Ellis

(57) ABSTRACT

A lure device for mimicking life-like movement of a piece of bait to attract and capture a fish includes a stem having a first end and a second end. A channel extends through the stem. A fishing line is slidably positioned within the channel. The channel includes an inlet that extends through an outer surface of the stem. The inlet is spaced from the second end by a distance exceeding a distance between the inlet and the first end. An outlet extends through the second end. A weight is coupled to the stem to urge the stem downward through a body of water. A pair of legs are coupled to and extend from the weight. The pair of legs trail along a bottom surface of the body of water while the stem and the fishing line extend upwardly relative to the bottom surface of the body of water.

10 Claims, 8 Drawing Sheets

LURE DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to lures and more particularly pertains to a new lure for mimicking life-like movement of a piece of bait to attract and capture a fish.

(2) Description of Related Art Including Information Disclosed Under 37 CFR 1.97 and 1.98

The prior art relates to lures. Lures are artificial objects that look like prey to attract fish to a fishing line. Lures are typically attached to the end of a fishing line, and are designed to mimic prey, fooling fish into biting the line and getting trapped by a hook. For example, the hook and a piece of bait may be attached to the end of the fishing line, next to the lure. Because the lures are attached to the end of the fishing line, they typically trail along the bottom surface of the body of water as the fisher slowly reels in the fishing line. This also causes the piece of bait and the hook to trail along the bottom surface of the body of water. Fishers often need to repeatedly reel in and re-cast the fishing line to attract fish to the movement of the lure. For example, when the fisher is trying to capture fish that are located above the bottom surface, the fisher may need to reel in and re-cast the line to minimize the amount of time the lure spends trailing along the bottom surface of the body of water. Additionally, although some lures include moving parts that can attract the attention of fish, those lures typically do not mimic the movement of live prey very closely, limiting the efficacy of those lures. Thus, there is a need in the art for a lure device that keeps the piece of bait and the hook off of the bottom surface of the body of water. Ideally, such a device would mimic the natural movement of live prey to more effectively attract fish to the hook.

BRIEF SUMMARY OF THE INVENTION

An embodiment of the disclosure meets the needs presented above by generally comprising a stem having a first end and a second end. A fishing line is slidably coupled to the stem. The fishing line has a terminal end that is configured to releasably retain a piece of bait wherein the fishing line is configured to facilitate capture of a fish. A channel extends through the stem. The fishing line is slidably positioned within the channel. The channel includes an inlet that extends through an outer surface of the stem. The inlet is spaced from the second end by a distance exceeding a distance between the inlet and the first end. An outlet extends through the second end of the stem. A weight is coupled to the stem wherein the weight is configured to urge the stem downward when the stem is positioned within a body of water. A pair of legs are coupled to and extend from the weight wherein the pair of legs are configured to trail along a bottom surface of the body of water while the stem and the fishing line are configured to extend upwardly relative to the bottom surface of the body of water.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
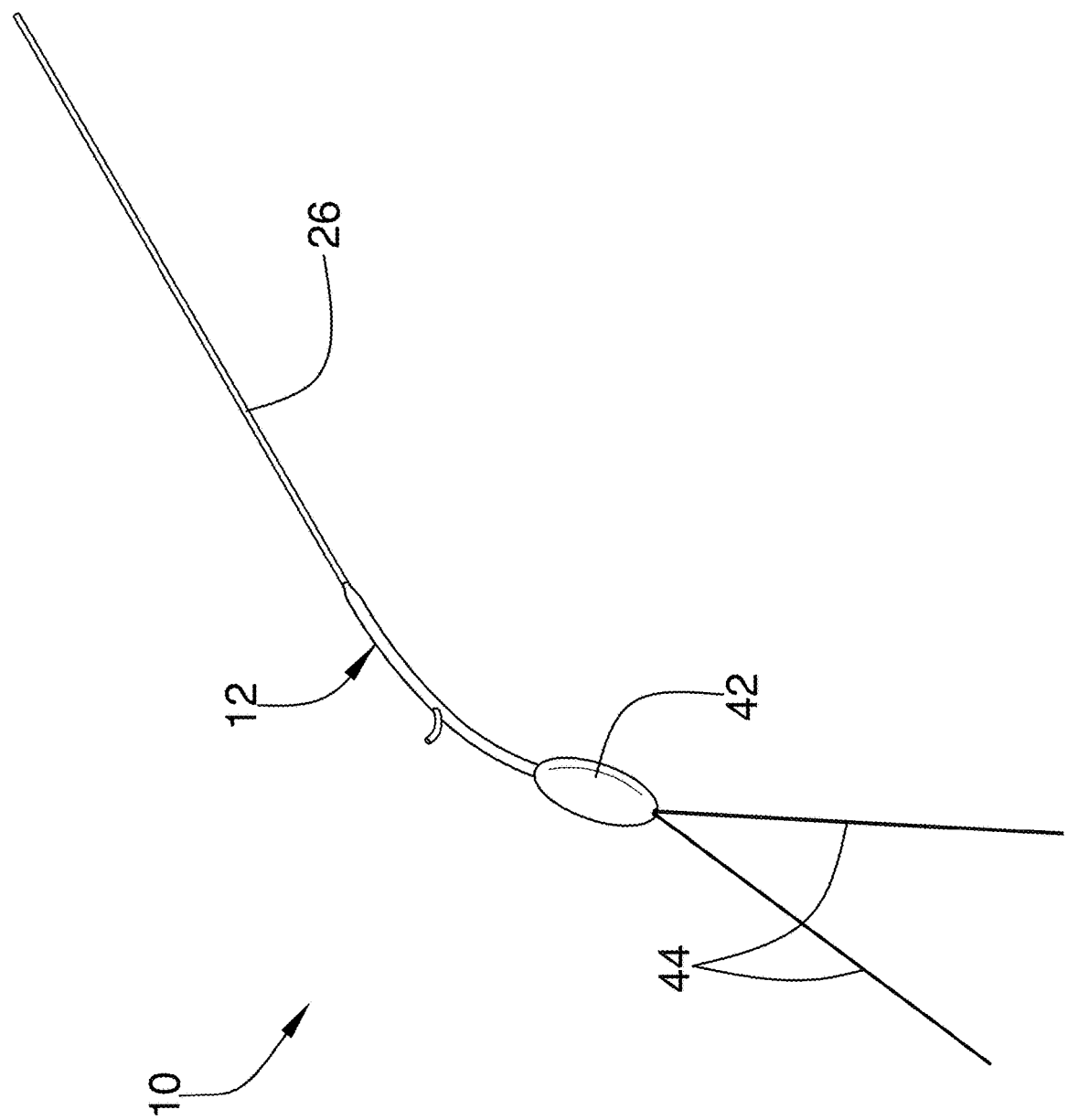
FIG. 1 is a front isometric view of a lure device according to an embodiment of the disclosure.
Figure 2:
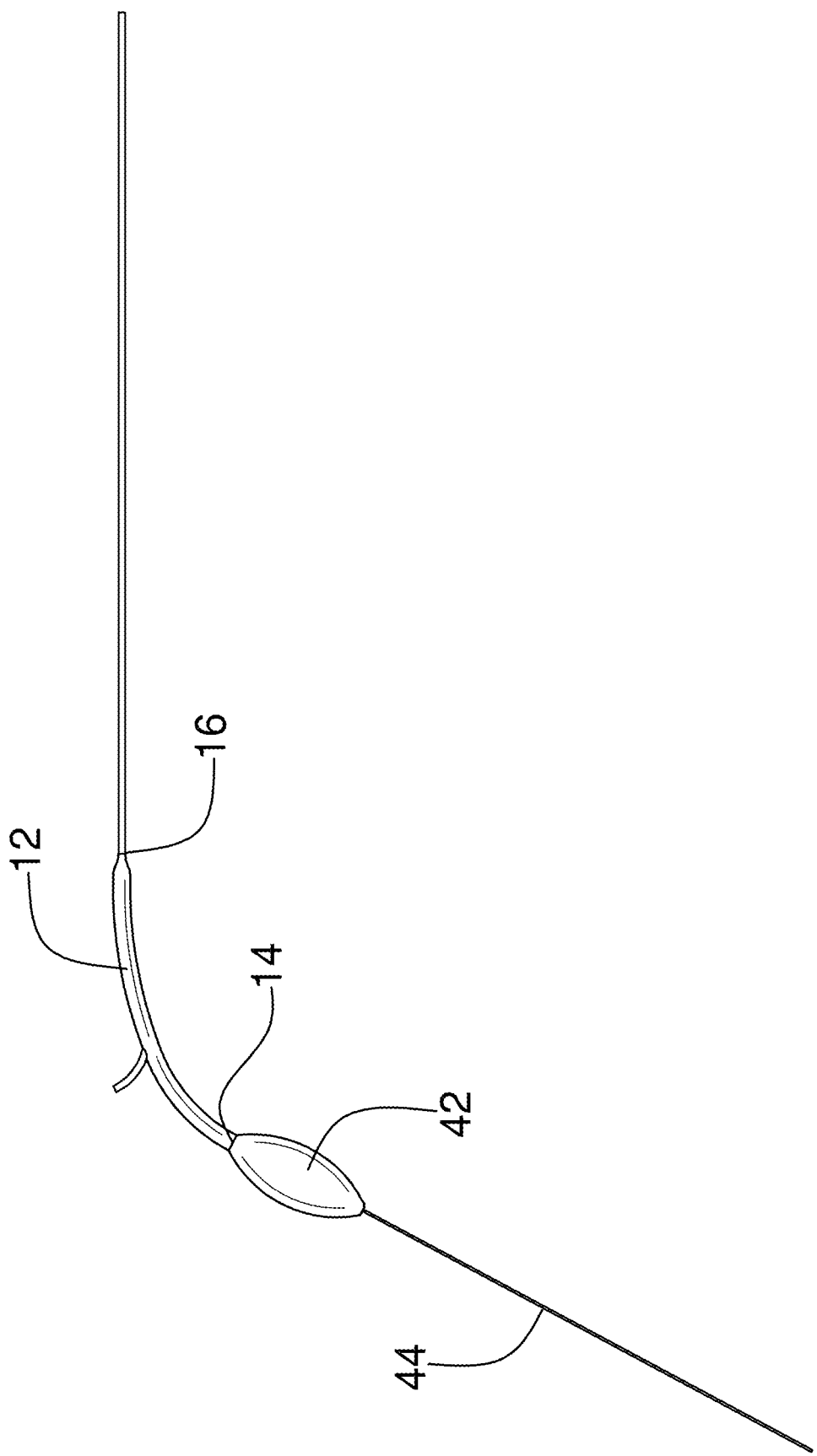
FIG. 2 is a side view of an embodiment of the disclosure.
Figure 3:
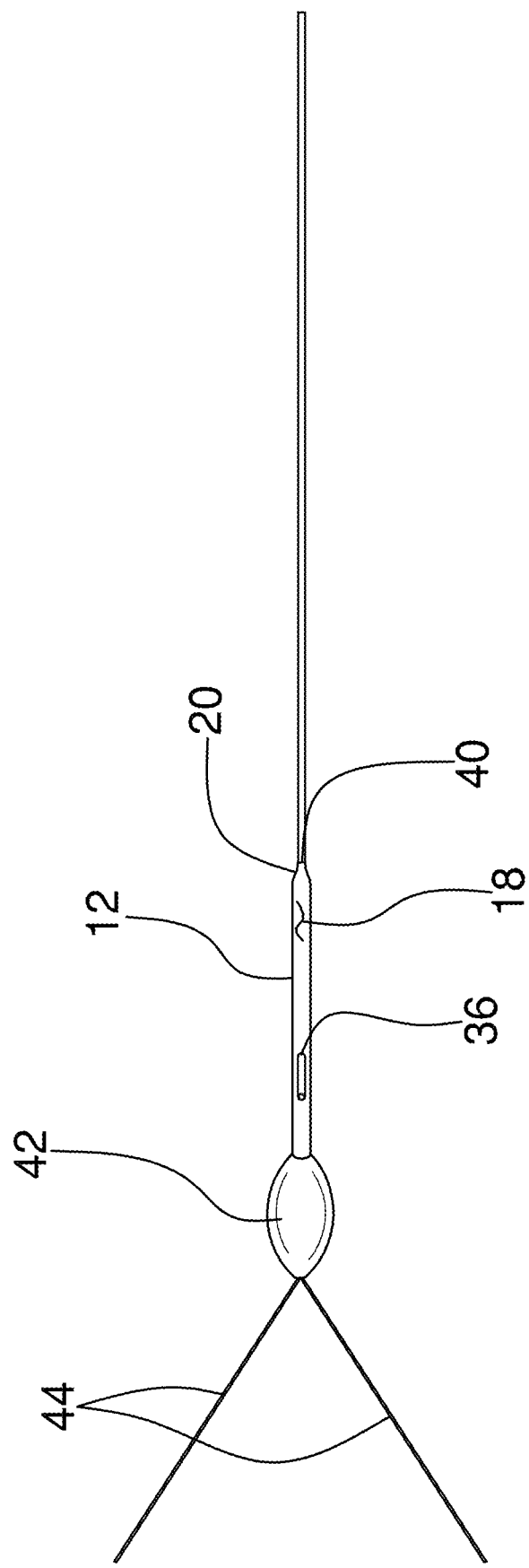
FIG. 3 is a top view of an embodiment of the disclosure.
Figure 4:
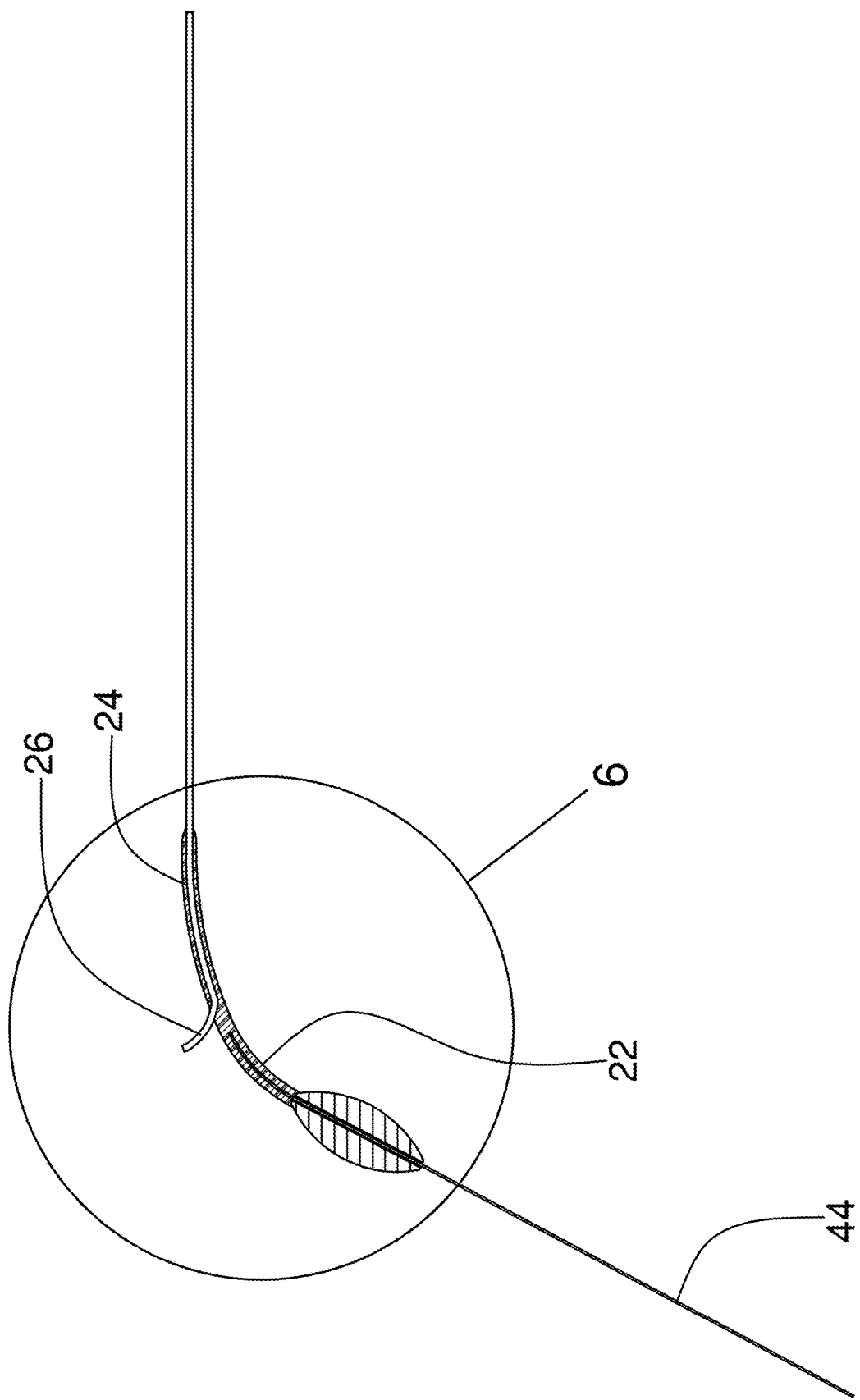
FIG. 4 is a cross-sectional view of an embodiment of the disclosure.
Figure 5:
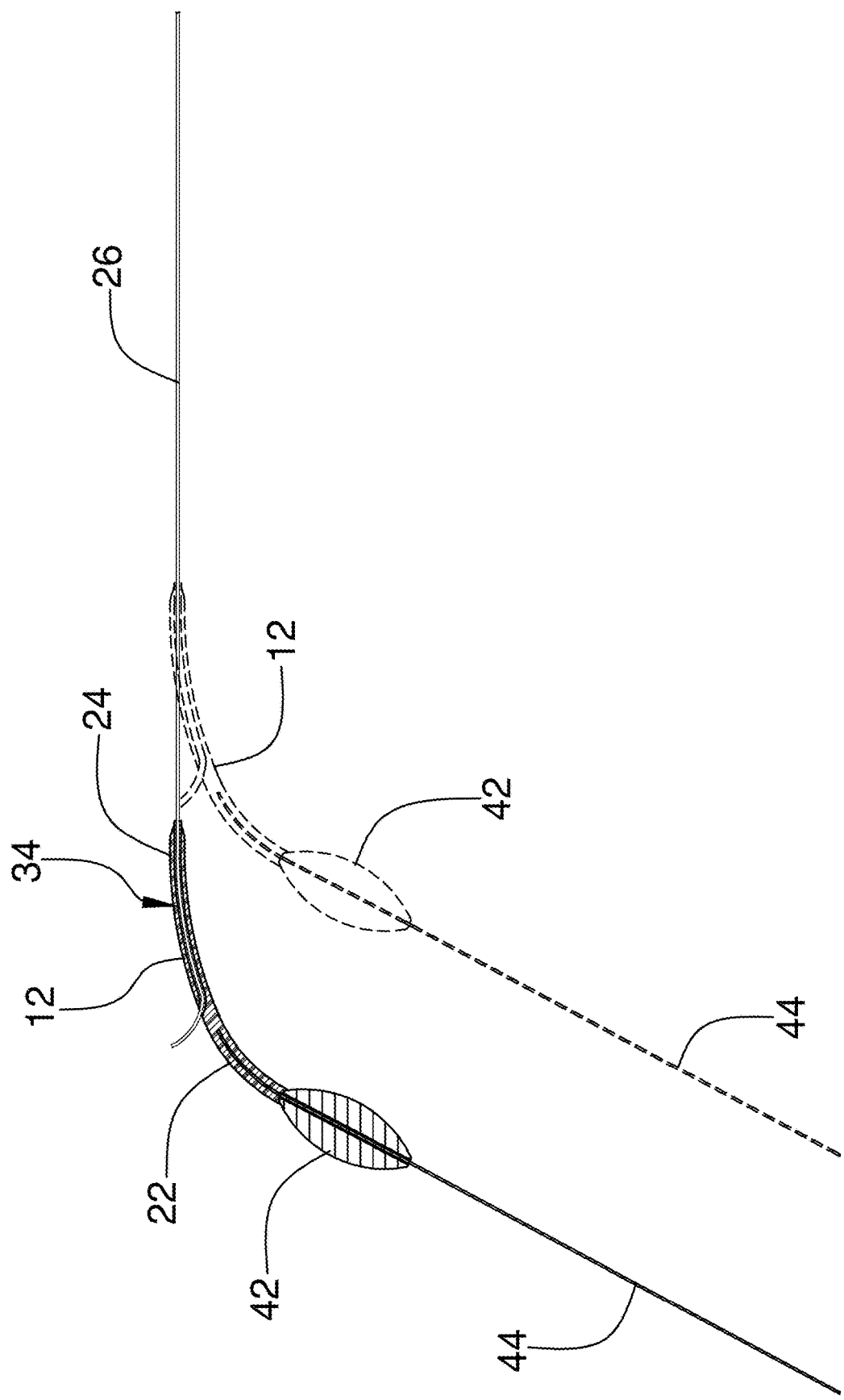
FIG. 5 is a cross-sectional view of an embodiment of the disclosure.

With reference now to the drawings, and in particular to FIGS. 1 through 8 thereof, a new lure embodying the principles and concepts of an embodiment of the disclosure and generally designated by the reference numeral 10 will be described.

As best illustrated in FIGS. 1 through 8, the lure device 10 generally comprises a stem 12 having a first end 14 and a second end 16. The stem 12 is generally rigid. The stem 12 generally has an outer surface 18. The stem 12 is generally elongated between the first end 14 and the second end 16. The stem 12 may have a tapered section 20 that extends from the second end 16 toward the first end 14 wherein the first end 14 has a diameter exceeding a diameter of the second end 16.

The stem 12 typically includes an arcuate section 22 extending from the first end 14. The arcuate section 22 is generally spaced from the second end 16 and the tapered section 20. A straight section 24 extends between the arcuate section 22 and the tapered section 20. The straight section 24 may be parallel to the tapered section 20. The arcuate section 22 and the straight section 24 may define an angle. In other words, the arcuate section 22 and the straight section 24 may angle said first end 14 outwardly and downwardly relative to said second end 16. The angle may be between 15.0° and 45.0°.

The stem 12 is generally elongated and includes the arcuate section 22 and the straight section 24 wherein the stem 12 is configured to resemble a lure bait. In other words, the stem 12 has a shape that is configured to resemble live prey, such a minnow or another small fish, which can attract the attention of bigger fish. The stem 12 may also have a color that is configured to resemble the lure bait. Examples of the color include green, blue, black, and grey, although other colors are also contemplated.

A fishing line 26 is slidably coupled to the stem 12. The fishing line 26 typically has a terminal end 28 that is configured to releasably retain a piece of bait 30 wherein the fishing line 26 is configured to facilitate capture of a fish 32, the piece of bait 30 may be attached to a hook, which can secure the fish 32 to the fishing line 26. More specifically, the stem 12 is slidable along the fishing line 26. Movement of the stem 12 along the fishing line 26 mimics movement of the piece of bait 30 through a body of water 38, both vertically relative to a bottom surface 46 of the body of water 38, and laterally relative to the bottom surface 46 of the body of water 38.

A channel 34 extends through the stem 12. The fishing line 26 is slidably positioned within the channel 34. The channel 34 includes an inlet 36 that extends through the outer surface 18 of the stem 12. The fishing line 26 extends into the channel 34 through the inlet 36. The inlet 36 is generally spaced from the second end 16 by a distance exceeding a distance between the inlet 36 and the first end 14 of the stem 12. More specifically, the inlet 36 may be positioned proximate to a junction between the arcuate section 22 and the straight section 24. In such embodiments, the inlet 36 may be angled upwardly and outwardly relative to the first end 14. The straight section 24 and the fishing line 26 are each configured to be positionable to extend outwardly and upwardly relative to the first end 14 of the stem 12 when the stem 12 is positioned within the body of water 38.

An outlet 40 generally extends through the second end 16 of the stem 12. The outlet 40 may be parallel to the second end 16 of the stem 12. The fishing line 26 generally extends outwardly from the channel 34 through the outlet 40. Because the fishing line 26 is slidably positioned within the channel 34, the terminal end 28 of the fishing line 26 may be positionable proximate to the outlet 40.

The stem 12 is generally hollow between the inlet 36 and the outlet 40 wherein the channel 34 is configured to reduce a mass of the stem 12 between the inlet 36 and the outlet 40. The channel 34 is thus configured to facilitate the second end 16 in floating upwardly relative to the first end 14 while the stem 12 is positioned within the body of water 38. The second end 16 may float upwardly to direct the terminal end 28 of the fishing line 26 upwardly, whereby the stem 12 is configured to inhibit the piece of bait 30 from trailing along the bottom surface 46 of the body of water 38.

A weight 42 is coupled to the stem 12. The weight 42 is configured to urge the stem 12 downward while the stem 12 is positioned within the body of water 38. The weight 42 is generally positioned on the first end 14 of the stem 12. The weight 42 is spaced from the second end 16 of the stem 12 wherein the weight 42 is spaced from the channel 34. Positioning the weight 42 on the first end 14, away from the channel 34, is configured to facilitate the second end 16 of the stem 12 in floating upwardly relative to the first end 14 while the stem 12 is positioned within the body of water 38.

Figure 6:
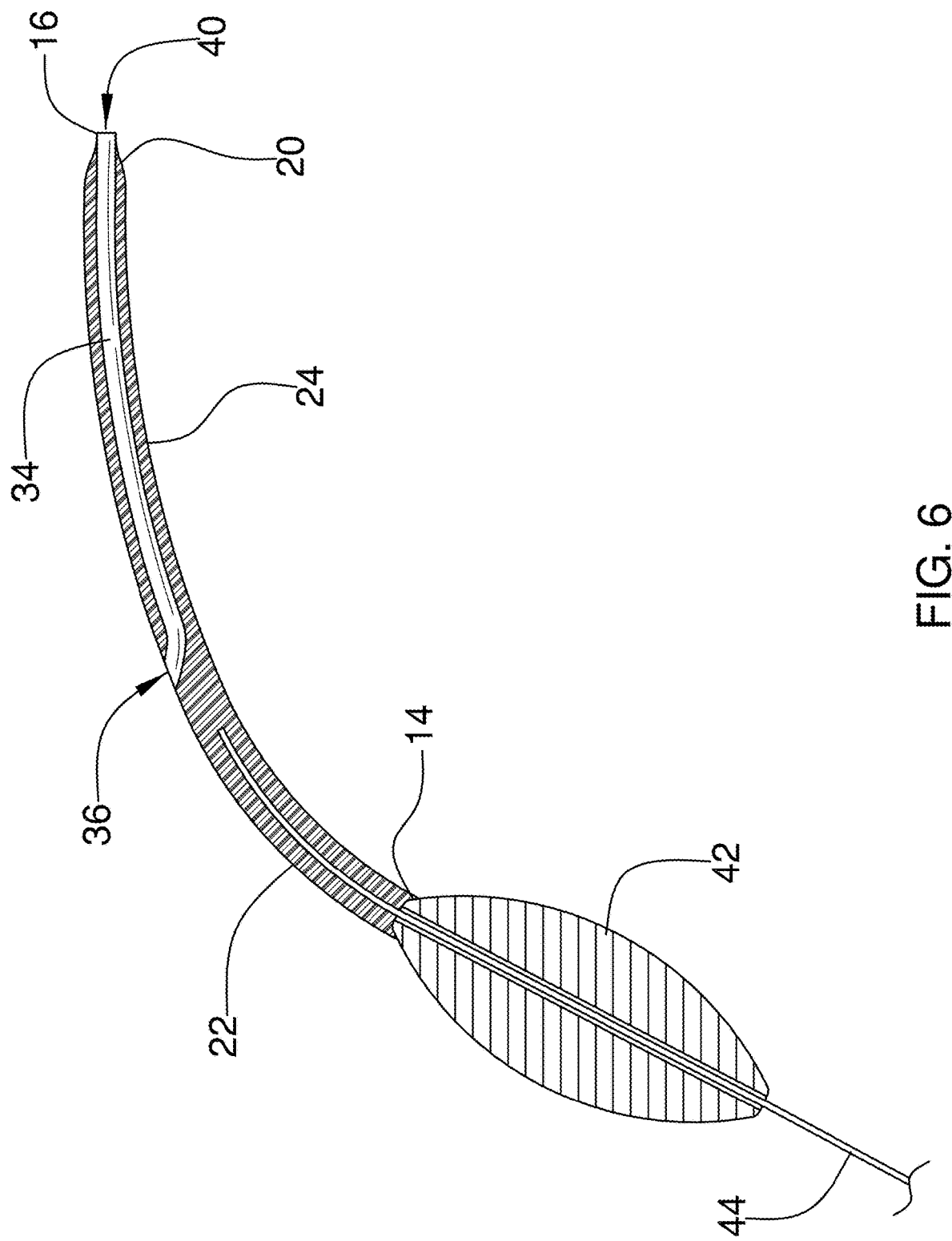
FIG. 6 is a cross-sectional view of an embodiment of the disclosure.
Figure 7:
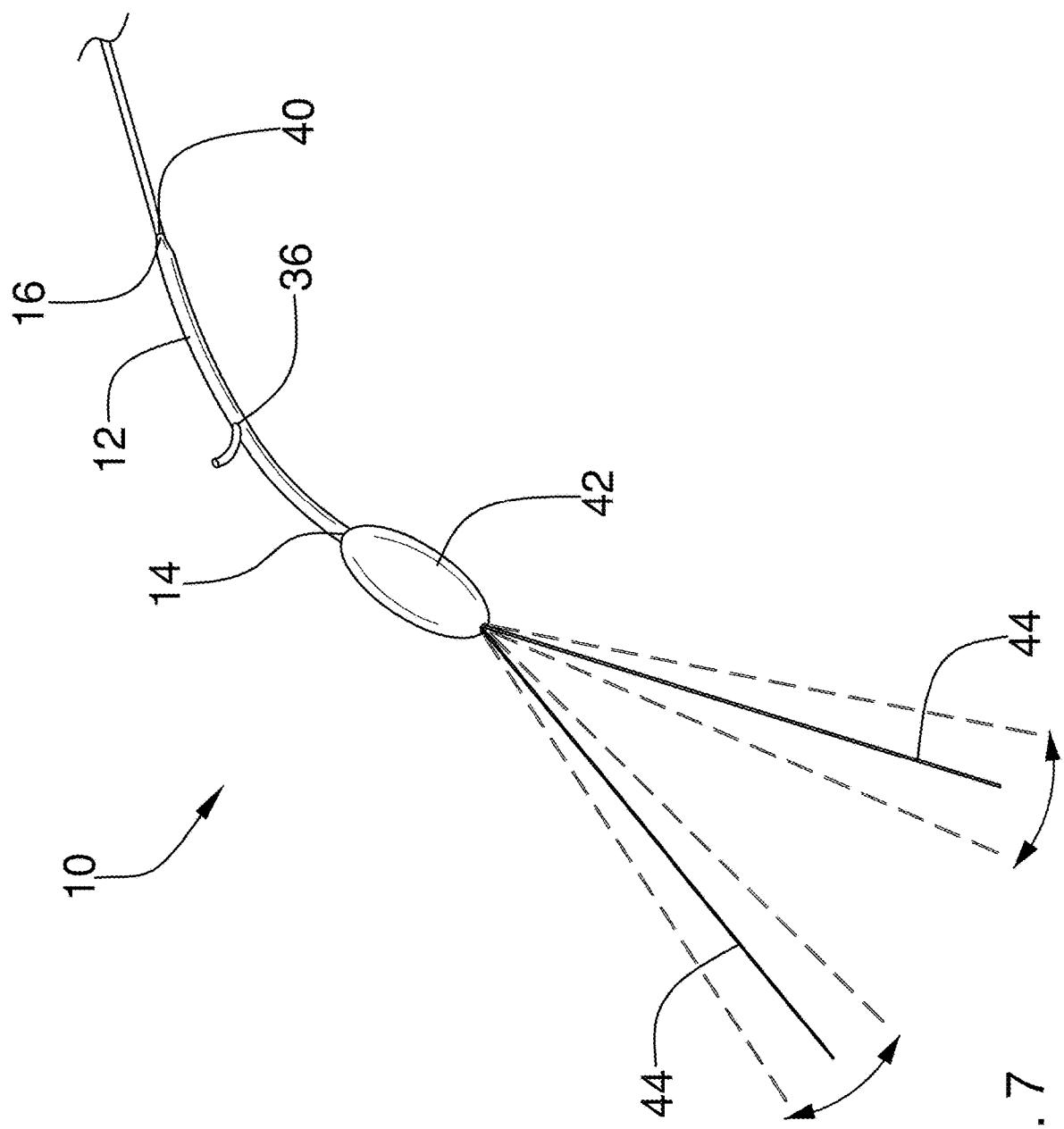
FIG. 7 is a detail view of an embodiment of the disclosure.
Figure 8:
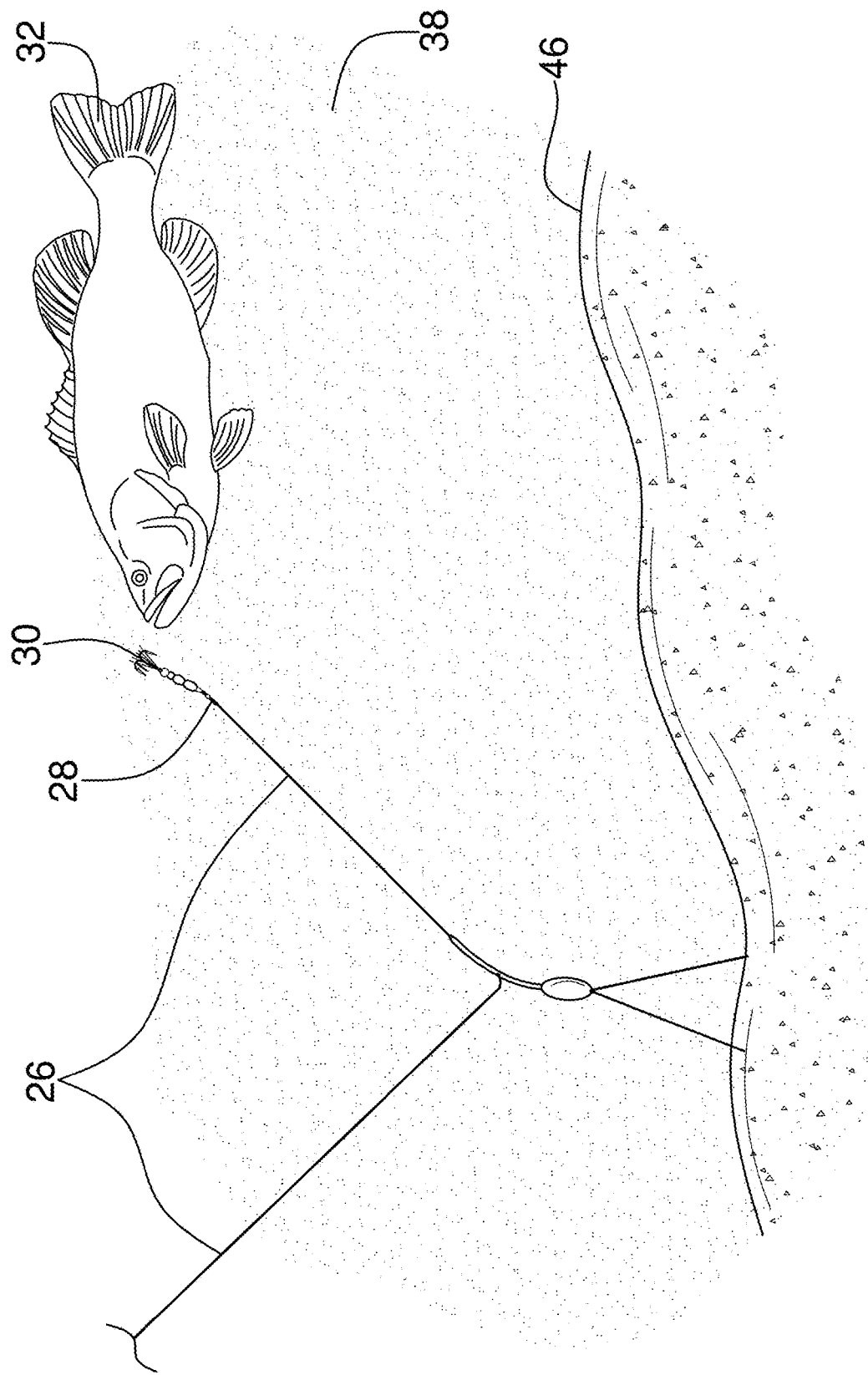
FIG. 8 is an in-use view of an embodiment of the disclosure.

A pair of legs 44 are coupled to and extend from the weight 42. The pair of legs 44 may extend through the weight 42 into the arcuate section 22 of the stem 12, as shown in FIG. 6. The pair of legs 44 are generally configured to trail along the bottom surface 46 of the body of water 38 while the second end 16 of the stem 12 and the fishing line 26 are configured to extend upwardly relative to the bottom surface 46 of the body of water 38. In other words, the pair of legs 44 and the stem 12 are generally configured to suspend the piece of bait 30 that is coupled to the fishing line 26 above the bottom surface 46 of the body of water 38. The weight 42 is generally positioned between the first end 14 of the stem 12 and the pair of legs 44 wherein the weight 42 is configured to urge the pair of legs 44 downwardly to the bottom surface 46 of the body of water 38.

The pair of legs 44 may be configured to create two points of contact with the bottom surface 46 of the body of water 38. With the two points of contact, the pair of legs 44 cause the stem 12 to move from side to side as the pair of legs 44 trail along the bottom surface 46 of the body of water 38. The side to side movement of the stem 12 wiggles the fishing line 26, and the piece of bait 30 attached to the terminal end 28 of the fishing line 26, in a way that imitates life-like action.

The angle that is defined by the arcuate section 22 and the straight section 24 of the stem 12 is also generally configured to facilitate the side to side movement of the stem 12 while the pair of legs 44 trail along the bottom surface 46 of the body of water 38. For example, the pair of legs 44 may be glued to the weight 42, or may be integrally coupled to the weight 42, wherein the stem 12, the weight 42, and the pair of legs 44 are rigidly coupled together. The rigidity of the stem 12, the weight 42, and the pair of legs 44 facilitates synchronized movement of the stem 12 and the weight 42 as the pair of legs 44 trail along the bottom surface 46 of the body of water 38.

The pair of legs 44 may be pivotable inwardly toward each other and outwardly away from each other. In such embodiments, each leg of the pair of legs 44 may be configured to independently cross detritus, such as rocks, debris, piles of sand, loose materials, and other objects, that are positioned on the bottom surface 46 of the body of water 38. Because each leg of the pair of legs 44 may cross different pieces of detritus, or may cross detritus at different times, the pair of legs 44 can be pivoted relative to each other to facilitate the lure in moving from side to side within the body of water 38. For example, the pair of legs 44 may be pivotable such that the pair of legs 44 are pivotable outwardly away from each other by a distance that is between 2.0 inches and 4.0 inches.

In use, the fishing line 26 can be threaded into the channel 34, through either the inlet 36 or the outlet 40. In other words, the inlet 36 and the outlet 40 are terms which are meant to indicate the two ends of the channel 34, and the positioning of those ends of the channel 34 relative to the stem 12. Once the fishing line 26 is slidably positioned within the channel 34 extending through the tube 12, the tube 12 can slide along the fishing line 26. The piece of bait 30, and the hook, can be coupled to the terminal end 28 of the fishing line 26. The pair of legs 44 may be pivoted inwardly or outwardly relative to each other, creating the desired distance between the pair of legs 44. The fishing line 26 can then be cast into the body of water 38, lowering the stem 12 until the pair of legs 44 make contact with the bottom surface 46 of the body of water 38. As explained above, the channel 34 is hollow and the weight 42 is attached to the first end 14 of the stem 12 to urge the pair of legs 44 downwardly to the bottom surface 46 while the second end 16 of the stem 12, and the terminal end 28 of the fishing line 26, float upwardly relative to the bottom surface 46.

The pair of legs 44 trail along the bottom surface 46, encountering detritus and moving along bumps and other protrusions on the bottom surface 46, wiggling the stem 12 from side to side and mimicking lifelike movement of the lure bait (i.e., the live prey that the stem 12 is designed to mimic in appearance). Side to side movement of the stem 12 also causes the fishing line 26, and the piece of bait 30 attached to the fishing line 26, to move from side to side relative to the bottom surface 46. Because the stem 12 can also slide along the fishing line 26, the stem 12 can move vertically relative to the bottom surface 46, further imitating lifelike movement of the live prey and the piece of bait 30.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded.

A reference to an element by the indefinite article "a" does not exclude the possibility that more than one of the element is present, unless the context clearly requires that there be only one of the elements.

We claim:

1. A fishing lure assembly comprising:
   a stem having a first end and a second end;
   a fishing line being slidably coupled to the stem, the fishing line having a terminal end being configured to releasably retain a piece of bait wherein the fishing line is configured to facilitate capture of a fish;
   a channel extending through the stem, the fishing line being slidably positioned within the channel, the channel including:
      an inlet extending through an outer surface of the stem, the inlet being spaced from the second end by a distance exceeding a distance between the inlet and the first end; and
      an outlet extending through the second end of the stem;
   a weight being coupled to the stem wherein the weight is configured to urge the stem downward when the stem is positioned within a body of water;
   a pair of legs being coupled to and extending from the weight wherein the pair of legs are configured to trail along a bottom surface of the body of water while the stem and the fishing line are configured to extend upwardly relative to the bottom surface of the body of water.

2. The fishing lure assembly of claim 1, wherein the pair of legs are configured to create two points of contact with the bottom surface of the body of water wherein the pair of legs cause the stem to move from side to side as the pair of legs trail along the bottom surface of the body of water wherein the side to side movement of the stem is configured to attract the fish to facilitate capture of the fish.

3. The fishing lure assembly of claim 1, wherein the stem is hollow between the inlet and the outlet wherein the channel is configured to reduce a mass of the stem between the inlet and the outlet whereby the channel is configured to facilitate the second end in floating upwardly relative to the first end while the stem is positioned within the body of water.

4. The fishing lure assembly of claim 3, wherein the weight is coupled to the first end of the stem, the weight being spaced from the second end of the stem wherein the weight is configured to facilitate the second end in floating upwardly relative to the first end while the stem is positioned within the body of water.

5. The fishing lure assembly of claim 4, wherein weight is positioned between the first end of the stem and the pair of legs wherein the weight is configured to urge the pair of legs downwardly to the bottom surface of the body of water.

6. The fishing lure assembly of claim 1, the stem further comprising a tapered section extending from the second end wherein the first end has a diameter exceeding a diameter of the second end.

7. The fishing lure assembly of claim 6, the stem further comprising:
   an arcuate section extending from the first end; and
   a straight section extending between the arcuate section and the tapered section, the arcuate section and the straight section defining an angle being between 15.0° and 45.0°.

8. The fishing lure assembly of claim 7, wherein the angle being defined by the arcuate section and the straight section of the stem is configured to facilitate the side to side movement of the stem while the pair of legs trail along the bottom surface of the body of water.

9. The fishing lure assembly of claim 1, wherein the pair of legs are pivotable inwardly toward each other and outwardly away from each other wherein each leg of the pair of legs is configured to cross detritus being positioned on the bottom surface of the body of water to facilitate the lure in moving from side to side.

10. A fishing lure assembly comprising:
    a stem having a first end and a second end, the stem having an outer surface, the stem being elongated between the first end and the second end, the stem having a tapered section extending from the second end wherein the first end has a diameter exceeding a diameter of the second end, the stem including:
       an arcuate section extending from the first end, the arcuate section being spaced from the second end; and
       a straight section extending between the arcuate section and the tapered section, the straight section being parallel to the tapered section, the arcuate section and the straight section defining an angle between the first end and the second end, the angle being between 15.0° and 45.0°;

a fishing line being slidably coupled to the stem, the fishing line having a terminal end being configured to releasably retain a piece of bait wherein the fishing line is configured to facilitate capture of a fish;

a channel extending through the stem, the fishing line being slidably positioned within the channel, the channel including:

an inlet extending through the outer surface of the stem, the fishing line extending into the channel through the inlet, the inlet being spaced from the second end by a distance exceeding a distance between the inlet and the first end of the stem, the inlet being positioned proximate to a junction between the arcuate section and the straight section wherein the inlet is angled upwardly and outwardly relative to the first end and wherein the straight section and the fishing line are each configured to be positionable to extend upwardly relative to the first end of the stem when the stem is positioned within a body of water; and an outlet extending through the second end of the stem, the outlet being parallel to the second end of the stem, the fishing line extending outwardly from the channel through the outlet wherein the terminal end of the fishing line is positionable proximate to the outlet, the stem being hollow between the inlet and the outlet wherein the channel is configured to reduce a mass of the stem between the inlet and the outlet whereby the channel is configured to facilitate the second end in floating upwardly relative to the first end while the stem is positioned within the body of water;

a weight being coupled to the first end of the stem wherein the weight is configured to urge the stem downward while the stem is positioned within the body of water, the weight being spaced from the second end of the stem wherein the weight is configured to facilitate the second end in floating upwardly relative to the first end while the stem is positioned within the body of water; and a pair of legs being coupled to and extending from the weight wherein the pair of legs are configured to trail along a bottom surface of the body of water while the second end of the stem and the fishing line are configured to extend upwardly relative to the bottom surface of the body of water, the weight being positioned between the first end of the stem and the pair of legs wherein the weight is configured to urge the pair of legs downwardly to the bottom surface of the body of water, the pair of legs being configured to create two points of contact with the bottom surface of the body of water wherein the pair of legs cause the stem to move from side to side as the pair of legs trail along the bottom surface of the body of water, the angle being defined by the arcuate section and the straight section of the stem being configured to facilitate the side to side movement of the stem while the pair of legs trail along the bottom surface of the body of water, the pair of legs being pivotable inwardly toward each other and outwardly away from each other wherein each leg of the pair of legs is configured to cross detritus being positioned on the bottom surface of the body of water to facilitate the lure in moving from side to side.

\* \* \* \* \*